United States Patent [19]
Naito et al.

[11] Patent Number: 4,784,234
[45] Date of Patent: Nov. 15, 1988

[54] MOTOR DRIVEN POWER STEERING SYSTEM

[75] Inventors: Hiroshi Naito, Toyota; Akihide Kamiya, Anjo, both of Japan

[73] Assignee: Aisin Seiki Kabushiki Kaisha, Kariya, Japan

[21] Appl. No.: 23,258

[22] Filed: Mar. 9, 1987

[30] Foreign Application Priority Data

Mar. 13, 1986 [JP] Japan ................................ 61-55687

[51] Int. Cl.$^4$ .......................................... B62D 5/04
[52] U.S. Cl. ..................................... 180/79.1; 74/409; 74/410
[58] Field of Search ............... 180/79.1, 79; 280/89; 74/409, 410

[56] References Cited

U.S. PATENT DOCUMENTS

| | | | |
|---|---|---|---|
| 4,147,071 | 4/1979 | Scribner et al. | 74/409 |
| 4,574,903 | 3/1986 | Hashimoto et al. | 180/79.1 |
| 4,580,648 | 4/1986 | Murakami et al. | 180/79.1 |
| 4,621,701 | 11/1986 | Takabayashi et al. | 180/79.1 |
| 4,645,024 | 2/1987 | Takabayashi | 180/79.1 |
| 4,667,759 | 5/1987 | Hashimoto et al. | 180/79.1 |
| 4,676,331 | 6/1987 | Iwaki et al. | 180/79.1 |
| 4,708,220 | 11/1987 | Noto et al. | 180/79.1 X |

FOREIGN PATENT DOCUMENTS

| | | | |
|---|---|---|---|
| 52661 | 5/1981 | Japan | 74/409 |
| 200747 | 12/1982 | Japan | 74/410 |
| 58-141963 | 8/1983 | Japan . | |
| 59-130781 | 7/1984 | Japan . | |
| 2137306 | 10/1984 | United Kingdom | 74/410 |

Primary Examiner—David M. Mitchell
Assistant Examiner—Mitchell J. Hill
Attorney, Agent, or Firm—Burns, Doane, Swecker & Mathis

[57] ABSTRACT

A power steering system uses an electric motor to produce an auxiliary torque which is added to the torque applied to the steering wheel of a vehicle by the driver. The system includes a couple mechanism for coupling the motor to the steering shaft. The system further includes a converting mechanism for converting a part of rotating force in the motor in an axial force and installed in the coupling mechanism and an elastic member for absorbing the axial force and installed in the coupling mechanism. This permits the elastic member to absorb the momentary shock occurred at starting condition of motor due to backlash of gears in the coupling mechanism.

3 Claims, 3 Drawing Sheets

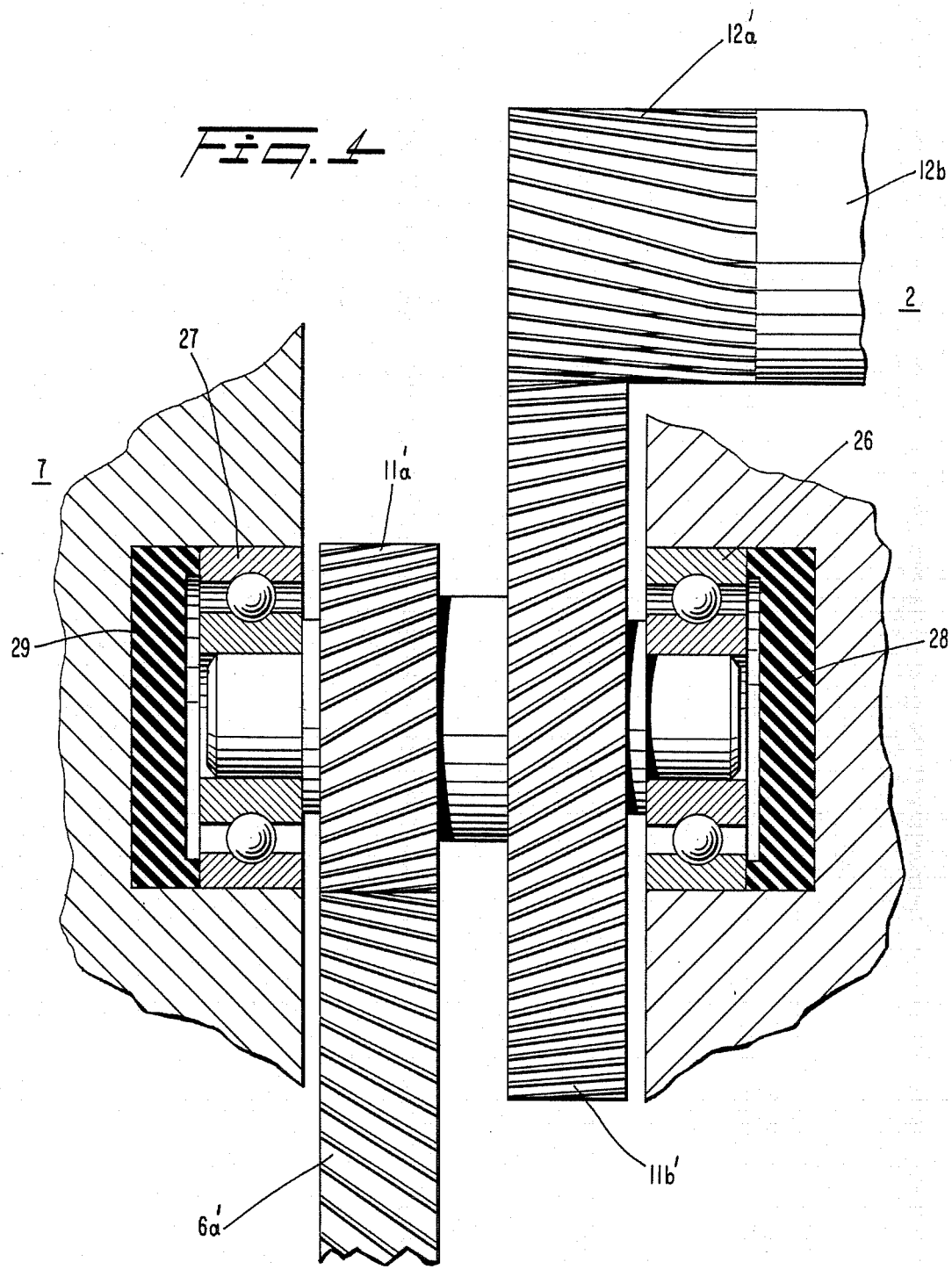

MOTOR DRIVEN POWER STEERING SYSTEM

BACKGROUND OF THE INVENTION

1. Field of the Invention

The invention relates to a motor driven power steering system in which an auxiliary steering force is generated by an electric motor.

2. Description of the Prior Art

A power-assisted steering system for helping a driver to steer an automobile is well known. In a conventional power steering system, an auxiliary steering force is generated in accordance with the steering by a driver and the force thus generated is transmitted to a steering gear. Most of the power steering systems in practical use at the present time are actuated by a hydraulic drive arrangement. The hydraulic drive arrangement of conventional power steering systems is equiped with a control valve, hydraulic cylinder and related structure to generate an auxiliary steering force by moving or displacing oil or other hydraulic fluid within the cylinder in accordance with a steering operation.

One significant disadvantage of the above-described known hydraulic power steering systems, especially in view of the trend toward small cars, is that the control valve, hydraulic cylinder and other related structures, as discussed above, are large in size. Large pressure losses are also encountered within connecting lines of the arrangement. To prevent pressure losses, any bends in the connecting line must be with small curvature. However, in the case of a vehicle not having a large mounting space in the engine room, such as a front drive vehicle, these containts make it difficult to mount the power steering system. Also, in a conventional hydraulic drive unit, an effective seal must be used to ensure that oil does not leak. Additionally, handling of the system is difficult.

In order to avoid the above-identified problems, it has been proposed to use a motor as a driving device for a power steering system.

Referring now to FIG. 3, there is shown the general construction of such a conventional motor driven power steering system. A first steering shaft 42 is connected to a steering wheel 41, and a second steering wheel shaft 45 is connected to the first shaft 42 via a first universal joint 44. A third steering shaft 47 is connected to the second shaft 45 via a second universal joint 46. The bottom end of the third shaft 47 is connected to a pinion gear (not shown) engaged with a rack (not shown) for performing the steering of tires. The first shaft 42 has a torque sensor 48 fixedly mounted thereto. A DC servo motor DM is connected to the third shaft 47 via reduction gearing 49. The output of torque sensor 48 is connected to a control apparatus 50, the output of which is connected to the motor DM.

The operation in the conventional motor driven power steering system is as follows:

During a steering operation, the torque sensor 48 detects torque applied to the first shaft 42. The output of torque sensor 48 is transmitted to the control apparatus 50. The control apparatus 50 operates to supply an electric current to the motor DM in accordance with both the magnitude and direction of the torque. The motor DM is rotated in accordance with the electric current. The rotational speed of motor DM is reduced gearing 49.

Thus, in the above-described motor driven power steering system, the rotation of an auxiliary motor for generating the auxiliary steering force is transmitted to the steering shaft by a reduction gearing system. In general, the reduction gearing may be formed with a gear engagement involving a plurality of gears.

Such reduction gearing engagement has a certain gears backlash due to an aspect of manufacturing accuracy of the gearing wherein a clearance exists between intermeshing gear teeth. Therefore, when the motor rotates so as to produce the auxiliary steering force, the clearence is closed as the gear teeth make contact. As a result, a shock occurs at the moment when gears engage each other. This shock reduced the driver's feel of the power steering effect.

SUMMARY OF THE INVENTION

Accordingly, it is an object of the present invention to provide an improved motor drive power steering system which can absorb the above-described momentary shock which can occur during starting conditions of the motor.

Another object of the present invention is to provide an improved motor driven power steering having smooth steering and construction.

These and other objects are achieved according to the present invention by installing an arrangement or means for converting a part of the rotating force of a motor into an axial force and providing an elastic member for absorbing the axial force within a coupling means for coupling the electric motor to a steering shaft. Therefore, according to the present invention, the momentary shock which may occur during starting conditions of the motor due to backlash between gears is transformed into displacement in axial direction and the displacement is absorbed by the elastic member. As the result, smooth steering is obtained and the driver's unpleasant feeling due to the momentary shock is removed.

BRIEF DESCRIPTION OF THE DRAWINGS

FIG. 4 is a view similar to FIG. 1 depicting helical gearing.

DESCRIPTION OF A PREFERRED EMBODIMENT

Hereinafter, the present invention will be explained in more detail in accordance with a preferred embodiment thereof with reference to the accompanying drawings.

Figure 1:
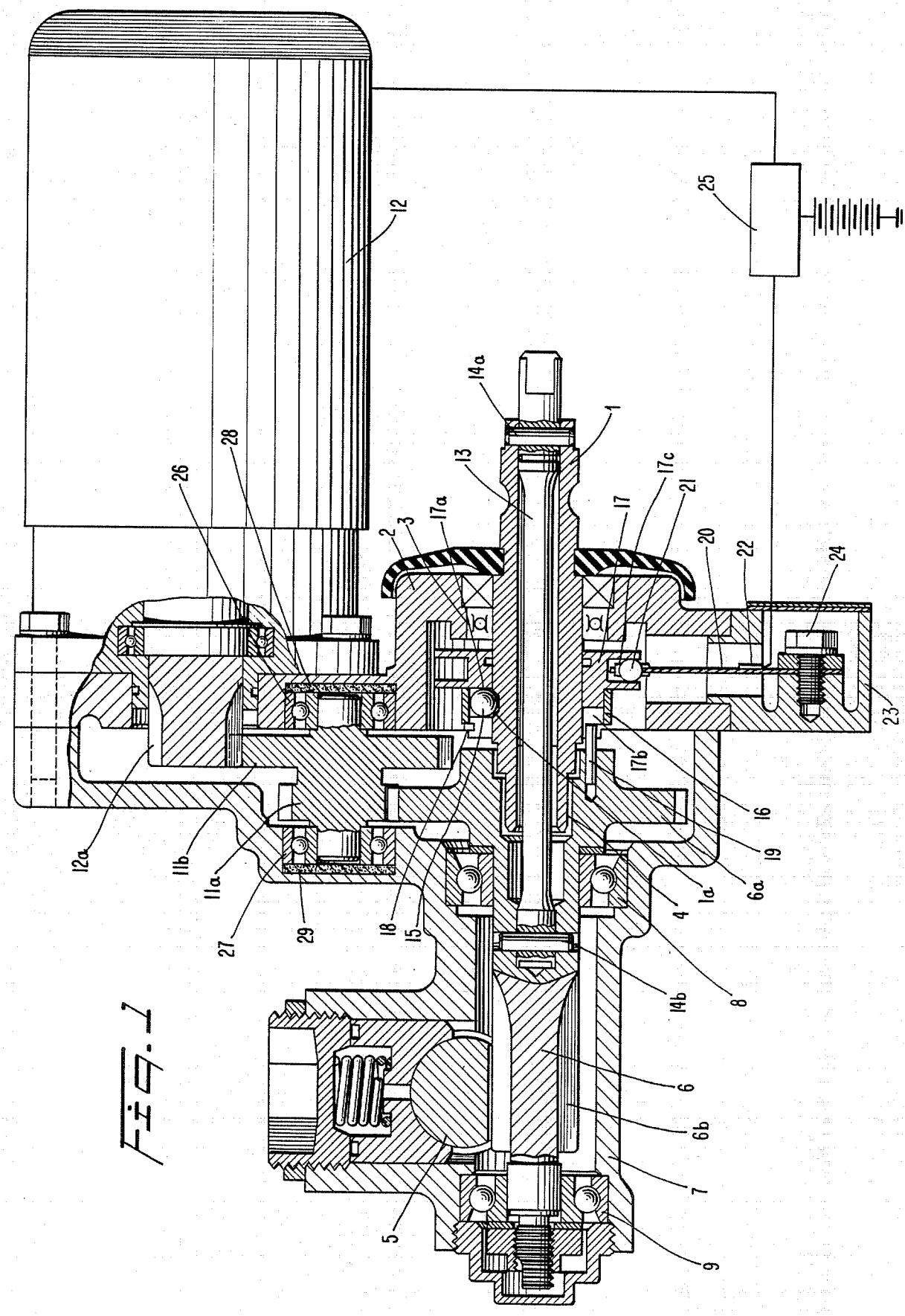
FIG. 1 is a sectional view showing an embodiment of a motor driven power steering system according to the present invention.

Referring now to FIG. 1, an input shaft 1 connected to a steering wheel (not shown) at one end thereof is connected to a pinion shaft 6 via a torsion bar 13. Namely, the shafts 1 and 6 are connected to the torsion bar 13 by pins 14a and 14b respectively.

Both ends of input shaft 1 are rotatably mounted on a bearing 3 fitted in an upper housing 2 and a bearing 4 fitted in an inner circumferential surface of pinion shaft 6. The pinion shaft 6 is rotatably mounted on a pair of angular bearings 8 and 9 installed in a lower housing 7 so as to reduce a clearance in an axial direction.

A spur gear 6a having an enlarged diameter is formed on the outer circumferential surface of pinion shaft 6.

The spur gear 6a is connected to a gear 12a formed on an output shaft of an electric motor 12 via intermediate gears 11a and 11b. The gears 6a, 11a, 11b and 12a comprise a coupling mechanism or arrangement for coupling the motor 12 to the pinion shaft 6.

A pinion gear 6b is formed on the pinion shaft 6. The pinion gear 6b engages with a rack 5 for steering tires (not shown) of the vehicle. The pinion gear 6b and the rack 5 comprise a steering gear mechanism.

A helical groove 1a is formed on a central portion of the input shaft 1. A ball element 15 or group of ball elements are installed in opening 17a formed on a sliding portion 17 which is axially slidably mounted on the input shaft 1. The ball element 15 is in contact engagement with the helical groove 1a. An annular groove 17c is formed on outer circumferential surface of the sliding 17. A slot 17b is formed on the slider section or portion 17 in an axial direction. A pin 19 is fixed to the pinoin shaft 6 and is engaged with the slot 17b so as to slide the slider section 17 in an axial direction and thereby rotate the slider 17 in accordance with the rotation of the pinion shaft 6. Reference numeral 16 indicates an annular member engaged with the slider section 17 and the reference numeral 18 indicates an elastic ring for holding or preventing the annular member 16 from being displayed.

A casing section 23 is provided on a part of upper housing 2. A lever 20, in the form of a leaf spring, is disposed in the case 23. A ball element 21 is supported on one end of the lever 20. The other end of lever 20 is fixedly connected to the case 23 by a bolt 24. The ball 21 is received in the annular groove 17C. A strain gauge 22, operating as a torque sensor, is fixed to the lever 20. The output signal of the strain gauge 22 is supplied to the motor 12 via a control apparatus 25.

Figure 2:
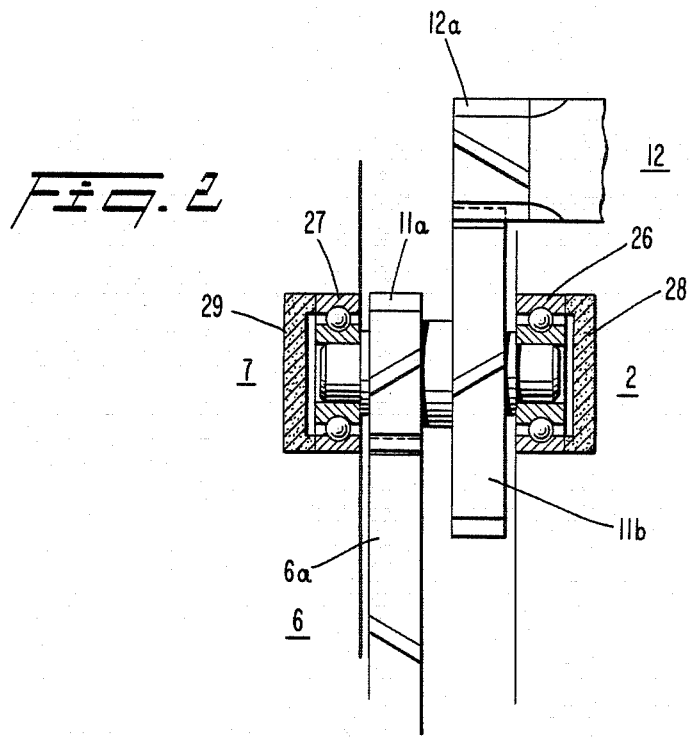
FIG. 2 is a partial sectional view showing details of mechanism elements in the embodiment of FIG. 1.
Figure 3:
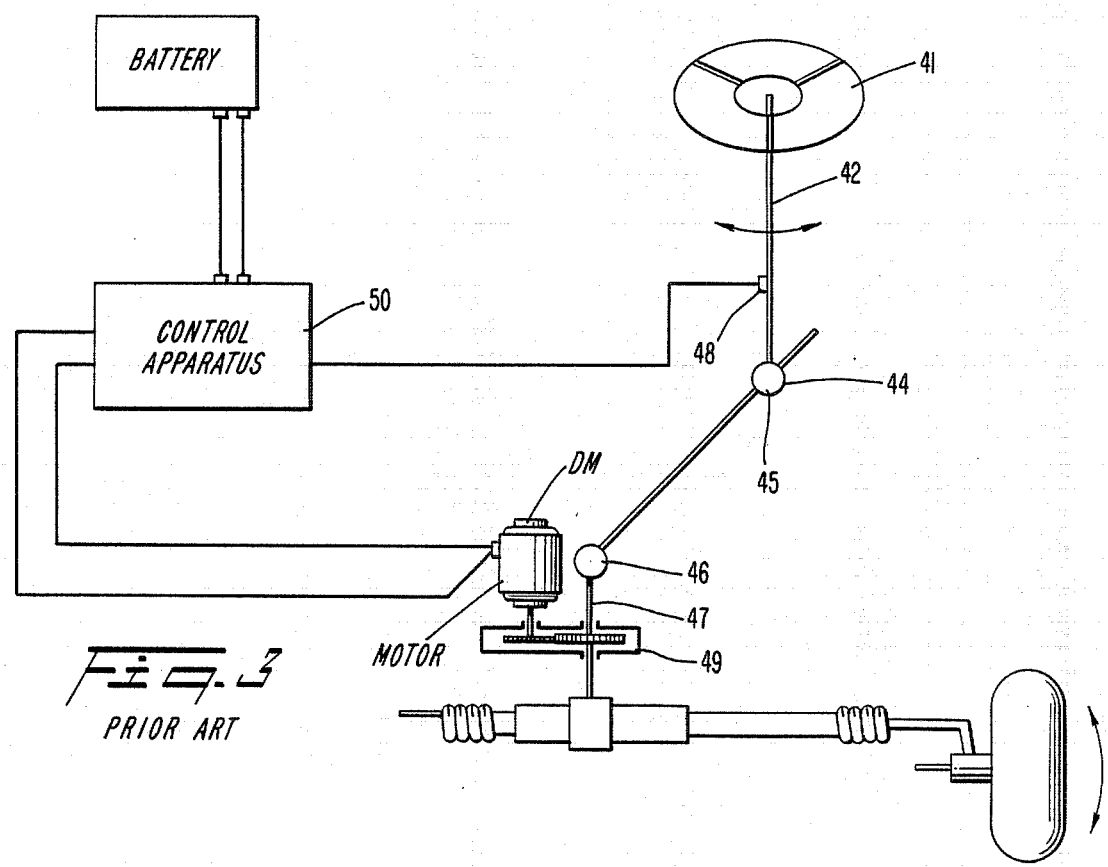
FIG. 3 is a schematic view showing a conventional motor driven power steering system.

Referring next to FIG. 2, there is shown a detailed construction of the coupling mechanism for the coupling the motor 12 to the pinion shaft 6. Intermediate gears 11a and 11b are unitary and coaxially supported by a bearing 26 installed in the upper housing 2 and a bearing 27 installed in the lower housing 7. An elastic member 28 is installed between upper housing 2 and bearing 26 A similar elastic member 29 is installed between lower housing 7 and bearing 27. The elastic members 28 and 29 are made of a shock absorbing material, for example, plastic resin or rubber, or a spring material.

The intermediate gears 11a' and 11b' and gear 6a' and gear 12a' are formed as helical gears, respectively. Therefore, if the direction of twist of gear 12a of motor as is rightward, (see FIG. 4) the twist direction of intermediate gears 11a; and 11b; is leftward, and the twist direction of gear 6a' of pinion shaft 6 is rightward.

The operation of the power steering arrangement is as follows:

When the steering wheel is rotated by the operator of the vehicle, the input shaft 1 rotates and the torsion bar 13 is twisted against pinion shaft 6 which is connected to the tire via rack 5. As a result, the input shaft 1 is rotated in relation to pinion shaft 6. The helical groove 1a is rotated by the relative rotation between the input shaft 1 and the pinion shaft 6. Due to the relation rotation, the slider element 17 is given a thrust force in an axial direction via the ball 15. The slider 17 is displaced in an axial direction in accordance with the rotational direction of the input shaft 1. The displacement of slider 17 twists the lever 20 by the movement of the ball 21 and will generate an electrical signal in accordance with the relative rotation of the strain gauge 22. This electrical signal transmitted by the strain gauge 22 is processed by the control apparatus 25.

The rotation of motor 12 is controlled by the control apparatus 25. The motor 12 is rotated in the direction corresponding to the rotating direction of input shaft 1 by the output of control apparatus 25.

The rotational speed of motor 12 is reduced by the coupling mechanism of gear 12a, intermediate gears 11b, 11a and gear 6 as transmitted to the pinion shaft 6a. By the rotation of pinion shaft 6, the rack 5 is moved and the tires are steered. The pinion shaft 6 rotates in a direction such that the aforesaid relative rotation between input shaft 1 and pinion shaft 6 is zero. As a result, by action of the pin 19 on the slider 17, the slider 17 is returned to the rest position defined by the bending of the lever 20, as measured by the strain gauge 22, is zero.

For absorbing the shock which occurs in the motor starting condition due to the backlash of gearing, the operation is as set forth below:

In the case where the steering wheel is rotated clockwise, the motor 12 is rotated clockwise by the control apparatus 25, during this time, the clearance between pinion gear 6b and rack 5 is shortened, accordingly the backlash between gear 12a and intermediate gear 11b is shortened or approaches zero. Subsequently, the intermediate gears 11b and 11a are rotated counterclockwise without any axial displacement. However, when clearance between intermediate gear 11a and gear 6a is shortened or approaches zero, leftward axial thrust force is then generated at intermediate gears 11a and 11b due to the rotational resistance of gear 6a. The direction of the thrust force for displacing intermediate gears 11a and 11b decides the twist direction of intermediate gears 11a and 11b. By the leftwardly directed thrust force of intermediate gears 11a, the intermediate gears 11a and 11b are displaced leftwardly with bending of the elastic member 29. After that, when the leftward thrust force of intermediate gears 11a and 11b is balanced with the reaction force of elastic member 29, the rotation of pinion shaft 6 is started.

Accordingly, the shock occurring at the moment when gears 11a and 6a engage each other after backlash is absorbed by elastic member 29.

When the steering wheel is rotated in the opposite direction (counterclockwise), the elastic member 28 accomplishes the same result as elastic member 29 discussed above.

Furthermore, helical gears in the coupling mechanism can be an alternative to the rack and ball screw arrangement.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A motor driven power steering system comprising:
   a steering shaft selectively rotatable in opposite directions;

an electric motor for providing a rotary force in opposite directions;

coupling means for operably coupling said electric motor to said steering shaft to transmit rotary force from the former to the latter, said coupling means including at least first and second interengageable gears for transmitting said rotary force, clearance existing between teeth of said first and second gears when said coupling means is at rest, said clearance being closed in response to relative rotation between said first and second gears in a manner creating a momentary impact;

torque sensor means for detecting the steering torque and direction thereof applied to said steering shaft and producing a steering torque signal for responding to the steering torque applied to the steering shaft; and control means connected to said torque sensor for controlling energization of said motor and the direction of rotation thereof dependent upon said steering torque signal from said torque sensor;

said gears comprising helical gears such that substantially all of said momentary impact is converted into an axial force;

said coupling means including elastic means arranged to absorb said axial force;

said elastic means disposed out of the path of transmission of said rotary force so as to transmit no rotary force.

2. A motor driven power steering system according to claim 1 wherein said helical gears are mounted on separate shafts, said elastic means comprising an elastic member disposed at an end of at least one of said shafts.

3. A motor driver power steering system according to claim 1 wherein said coupling means comprises a first helical gear driven by said motor, second and third helical gears mounted on a common shaft, and a fourth helical gear, said second helical gear being in mesh with said first helical gear to define said first and second rotating members, said third helical gear being in mesh with said fourth helical gear, said common shaft being axially displaceable and said elastic means comprising elastic members disposed at opposite ends of said common shaft.

* * * * *